Patented Feb. 26, 1929.

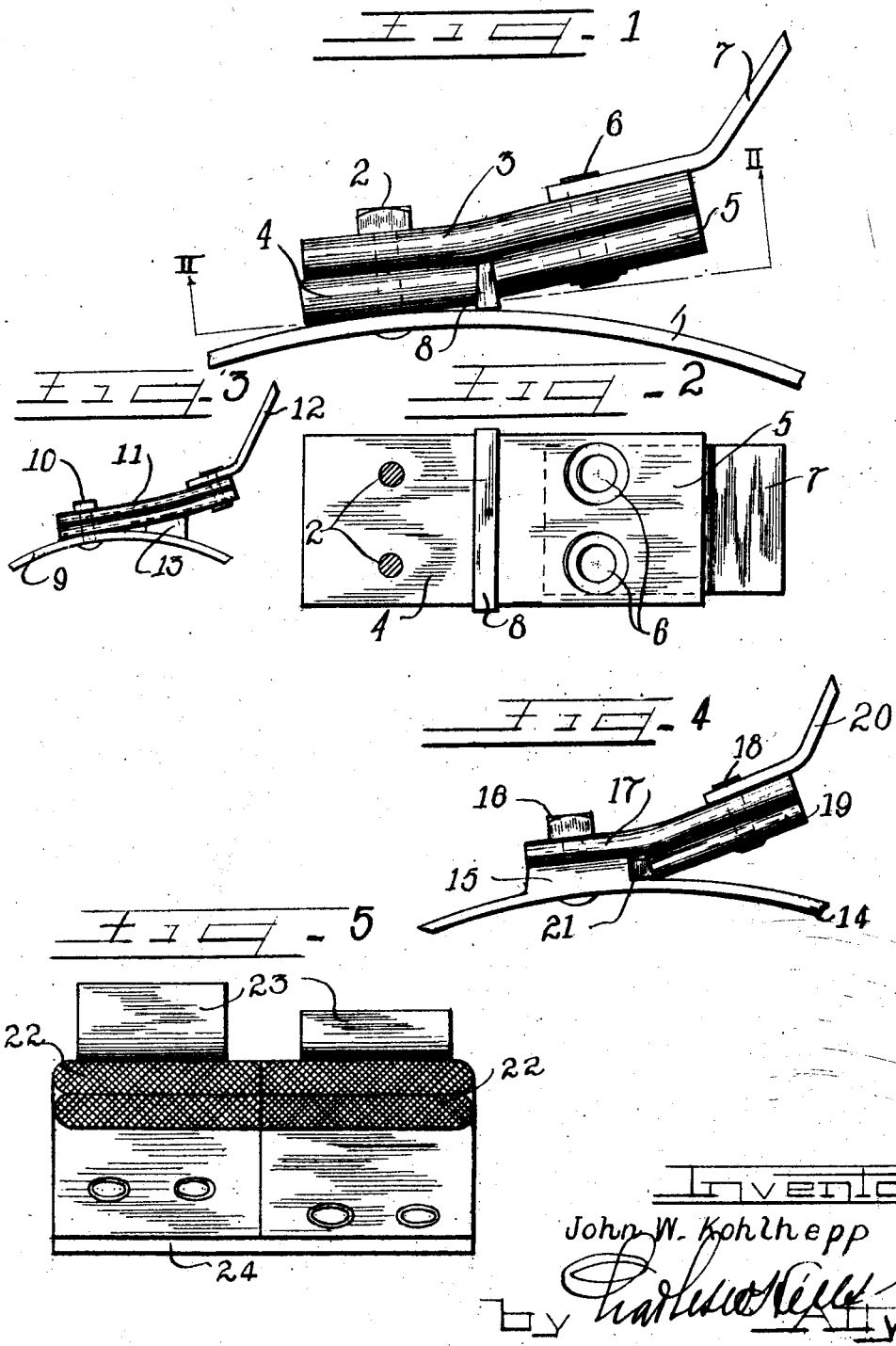

1,703,347

UNITED STATES PATENT OFFICE.

JOHN W. KOHLHEPP, OF CHICAGO, ILLINOIS.

BEATER ARM.

Application filed November 12, 1925, Serial No. 68,533. Renewed January 2, 1929.

In carcass dehairing machines the beater rings or drums are provided with a plurality of circumferential beater arms usually constructed of a plurality of layers of canvas or other stout fabric to which beater blades are secured. When the flexible beater arms are new or substantially so, they assume a tangential position with respect to the periphery of the beater drum and when said drum rotates, said arms gradually lose their resiliency and tend to lie flat against the peripheral surface of the drum. The beater arms thus become less efficient and usually have to be replaced by new beater arms.

To overcome the above defects in beater arm mechanisms and to prolong the life of the same this invention has been devised to provide a beater drum with flexible beater arms which, after losing their resiliency, are adapted to have wedge members associated therewith for the purpose of holding the beater arms in a projected position away from the periphery of the beater drum so that said beater arms may function efficiently.

It is an object of this invention to provide a carcass dehairing beater drum with beater arms adapted to have wedge members associated therewith to prolong the life of the beater arms after the same have lost their resiliency.

It is also an object of this invention to provide a carcass dehairing beater drum with a beater arm constructed of a plurality of layers or plies of material, one of said layers adapted to have a wedge member engaged therewith for the purpose of holding the free end of the beater arm projected outwardly away from the periphery of the beater drum.

It is an important object of this invention to provide a carcass dehairing wheel or drum with an improved beater arm adapted to have a wedge member engaged therewith to prolong the life of the beater arm after the same has been used and has lost its stiffness.

Other and further important objects of this invention will be apparent from the disclosures in the specification and the accompanying drawings.

The invention (in a preferred form) is illustrated in the drawings and hereinafter more fully described.

On the drawings:

Figure 1 is a fragmentary side elevation of a carcass dehairing beater drum having mounted thereon an improved beater arm and wedge mechanism embodying the principles of this invention.

Figure 2 is a bottom plan view of the beater arm taken on the line II—II of Figure 1.

Figure 3 is a fragmentary side elevation of a beater drum having mounted thereon a modified form of beater arm and wedge.

Figure 4 illustrates another modified form of beater arm associated with a modified form of beater drum.

Figure 5 is an end view of a multiple type beater arm.

As shown on the drawings:

The reference numeral 1 indicates a fragmentary portion of a carcass dehairing wheel or drum constructed of metal or other suitable material. Rigidly secured to the outer peripheral surface of the drum 1, by means of bolts 2 or other suitable means, is a beater arm constructed of heavy canvas or other stout fabric. The beater arm comprises an outer section 3 and two inner sections 4 and 5 having the inner ends thereof positioned adjacent one another. The retaining bolts 2 project through the beater arm sections 3 and 4 to hold the same secured in position. The inner beater arm section 5 is secured to the under face of the free end of the outer beater arm section 3 by means of bolts or rivets 6 which also serve to hold scrapers or beater blades 7 secured to the outer face of the outer beater arm section 3. When a beater arm is originally secured in position by means of the bolts 2 to the outer peripheral surface of a beater drum 1, said beater arm assumes a position which is substantially tangential with respect to the outer face of the drum, thereby allowing the free end of the beater arm to move toward and away from the outer surface of the drum during a beating or dehairing operation when said drum is rotated.

It has been found in practice that beater arms after having been used for a certain length of time lose their stiffness and the free ends of said beater arms gradually move toward the outer peripheral surface of the beater drum, losing their resiliency so that they do not function properly in the beating and scraping of carcasses. When this condition occurs it becomes necessary to replace the beater arms by new ones. In order to prolong the life of a beater arm after the same has lost its stiffness or resiliency the free end of the beater arm is pulled outwardly, thereby separating the adjacent ends of the inner beater arm sections 4 and 5. A wedge 8, constructed of any desired material, is then inserted between the adjacent ends of the inner beater arm sections 4 and 5, to hold the free end of the beater arm projected outwardly from the outer peripheral surface of the beater drum 1. It will thus be seen that the beater arm may again be used for a considerable length of time before replacement.

Figure 3 illustrates a modified form of the device wherein a beater drum 9 has secured thereto by means of bolts 10, one end of a double layer beater arm 11, the outer face of which has rigidly mounted thereon a beater blade 12. After the beater arm 11 has been in use for some time and has lost its resiliency and conforms to the contour of the drum 9, a wedge 13 is secured in position between the outer peripheral surface of the drum 9 and the bottom surface of the beater arm 11. The wedge 13 thus tends to project the free end of the beater arm 11 outwardly away from the outer peripheral surface of the drum 9.

Figure 4 covers a beater drum 14 having integrally formed on the outer peripheral surface thereof a boss 15 to which is rigidly secured by means of bolts 16 one end of a flexible beater arm 17. Secured by means of rivets or bolts 18 to the under face of the free end of the beater arm 17 is a lower beater arm section 19, the inner end of which is normally positioned adjacent one end of the beater drum boss 15. The rivets or bolts 18 also serve to hold a beater blade 20 secured to the outer face of the long beater arm section 17. Normally the beater arm 17—19 assumes a position substantially tangential to the outer peripheral surface of the beater drum 14. After the beater arm has been in use for some time and has lost its resiliency it tends to conform to the shape of the beater drum. For the purpose of extending the life of the beater drum to obviate replacement, the free end of the beater arm is pulled outwardly away from the drum 14 and a wedge 21 is secured in position between the drum boss 15 and the inner end of the short beater arm section 19. The wedge 21 acts to hold the free end of the beater arm projected outwardly from the peripheral surface of the drum 14, thereby permitting the rejuvenated beater arm to continue functioning until the parts are completely worn out.

Figure 5 discloses a modified form of beater arm mechanism comprising a pair of adjacently positioned flexible beater arm sections 22 having mounted on the free ends thereof beater blades 23. The two beater arm sections 22 are formed by longitudinally splitting a wide beater arm for a portion of its length. The portion of the wide beater arm which is not split is rigidly secured by means of bolts or other suitable means to the outer peripheral surface of a beater drum. The bottom layer of the beater arm sections 22 are cut transversely at the inner end of the longitudinal slit in the wide beater arm to permit a wedge member 24 to be inserted between the inner ends of the lower beater arm sections and the lower section of the mounting portion of the wide beater arm to hold the outer ends of the beater arm sections projected outwardly away from the outer peripheral surface of a beater drum after said beater arm sections 22 have been in use for some time and have lost their resiliency.

It will, of course, be understood that the beater arms may be made of any desired size and shape and may consist of only one arm or of a plurality of beater arm sections positioned adjacent one another as illustrated in Figure 5. It will also be understood that the wedge members may be positioned between portions of a beater arm or may be positioned between the beater arm and the peripheral surface of a beater drum or similar support.

The main purpose of the invention is to provide a wedge mechanism which may be associated with a slit beater arm to prolong the use and life of such a beater arm after the same has been in service on a beater drum and has lost its stiffness or resiliency so that it cannot function easily for the purpose of dehairing carcasses and the like.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. The combination with a carcass dehairing beater drum, of a flexible beater arm mounted thereon, and wedge means adapted to be inserted in the beater arm to hold the free end of the beater arm projected away from said beater drum.

2. The combination with a carcass dehairing drum, of a flexible beater arm secured thereto, beater blades on said beater arm, and a wedge adapted to be engaged in said beater arm for the purpose of prolonging the life and use thereof.

3. A beater comprising a flexible arm having a slot therein, and a member adapted to be inserted into said slot to increase the resiliency of the beater.

4. The combination with a carcass dehairing drum, of a flexible beater arm having one end thereof rigidly secured to said drum, scraping means on said beater arm, an inner beater arm section secured to said beater arm, and a wedge adapted to be removably engaged behind said beater arm section to hold the free end of the beater arm projected away from the beater drum after said beater arm has been in use for some time and has lost its resiliency.

5. The combination with a flexible beater arm, of wedge means adapted to be removably engaged therein to extend the life of the beater arm.

6. The combination with a beater drum, of a beater arm mechanism mounted thereon comprising an outer beater section, a plurality of inner beater sections secured thereto, beater blades on said outer beater section, and means adapted to be engaged between the inner beater sections to hold the free end of the beater arm projected away from the outer peripheral surface of said drum.

7. The combination with a beater drum, of a flexible beater arm secured thereto, an auxiliary beater section secured to the free end of said arm, and a wedge means adapted to be engaged between the beater drum and said auxiliary beater section to hold the free end of the beater arm projected away from the said drum after the beater arm had been in service and lost its resiliency.

8. The combination with a carcass dehairing machine beater drum, and the beater arms thereof, of members adapted to be removably wedged into the beater arms and said beater drum to hold the free ends of said beater arms projected away from the peripheral surface of said drum after the beater arms have been in extensive use and have lost their resiliency.

In testimony whereof I have hereunto subscribed my name.

JOHN W. KOHLHEPP.